(12) United States Patent
Sun et al.

(10) Patent No.: US 6,428,107 B1
(45) Date of Patent: Aug. 6, 2002

(54) HEAT ADDED TO UNDERGROUND CEMENTED FILL TO OBTAIN BOTH EARLY AND LONG TERM STRENGTH INCREASES

(75) Inventors: Henghu Sun, Sudbury; Harvey David Buksa, Lively, both of (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 09/723,627

(22) Filed: Nov. 28, 2000

(51) Int. Cl.$^7$ .................................................. E21F 15/00
(52) U.S. Cl. ........................................ 299/11; 405/272
(58) Field of Search ............................ 299/11; 405/272, 405/267; 406/197, 198; 137/334, 341; 219/678, 679, 687

(56) References Cited

U.S. PATENT DOCUMENTS

| | | | |
|---|---|---|---|
| 2,350,715 A | * 6/1944 | Berg et al. | 222/146.4 |
| 2,491,194 A | * 12/1949 | McShea | 134/107 |
| 2,522,677 A | * 9/1950 | Kelly | 222/146.4 |
| 3,340,693 A | 9/1967 | Row | 923/323 |
| 3,478,520 A | 11/1969 | Andy et al. | 61/35 |
| 3,589,567 A | * 6/1971 | Von Und Zu Massenbach | 222/136 |
| 4,101,333 A | 7/1978 | Wayment | 106/85 |
| 4,306,814 A | 12/1981 | Magni | 366/10 |
| 4,798,628 A | 1/1989 | Mills et al. | 106/104 |
| 4,877,453 A | 10/1989 | Loggers | 106/118 |
| 4,934,561 A | * 6/1990 | Ness et al. | 219/687 |
| 4,992,103 A | 2/1991 | Smart | 106/695 |
| 5,106,422 A | 4/1992 | Bennett et al. | 106/705 |
| 5,141,365 A | 8/1992 | Smart | 405/267 |
| 5,193,906 A | * 3/1993 | Neufeldt et al. | 366/148 |
| 5,328,508 A | 7/1994 | Lin | 106/723 |
| 5,340,235 A | 8/1994 | Milliken | 405/128 |

FOREIGN PATENT DOCUMENTS

| | | |
|---|---|---|
| CA | 2235526 | 10/1999 |
| CN | 1057825 | 6/1990 |
| CN | 1067707 | 6/1991 |
| SU | 1229319 | 5/1986 |

OTHER PUBLICATIONS

Neville, A.M., Concrete Technology, 1987, Longman Scientific & Technical, pp. 170–175.*
Orchard, Dennis Frank, Concrete Technology, 1973, Halsted press, pp. 201–206,253.*

* cited by examiner

Primary Examiner—Heather Shackelford
Assistant Examiner—John Kreck
(74) Attorney, Agent, or Firm—Edward A. Steen

(57) ABSTRACT

A method and apparatus for increasing the early and long term strength of underground cemented backfills includes adding heat to the backfill. A cementitious binder is mixed with a sand component and water to form the mine backfill that may be a slurry or a paste. Heat is added to the backfill before the backfill is supplied to a mine cavity and this has been found to increase the early and long term strength of an underground cemented fill resulting from the backfill in the mine cavity. The backfill from the mixing step is mixed to have a pulp density of about 55% to 87%. Heat is added to the backfill so that the backfill has a temperature of about 18 to 60° C. when it is supplied to the mine cavity. Heat is either added by heating the sand or water before the mixing step, or by heating the backfill after the mixing step. The mixing step uses a binder content of about 1.5 to 10% by weight.

12 Claims, 5 Drawing Sheets

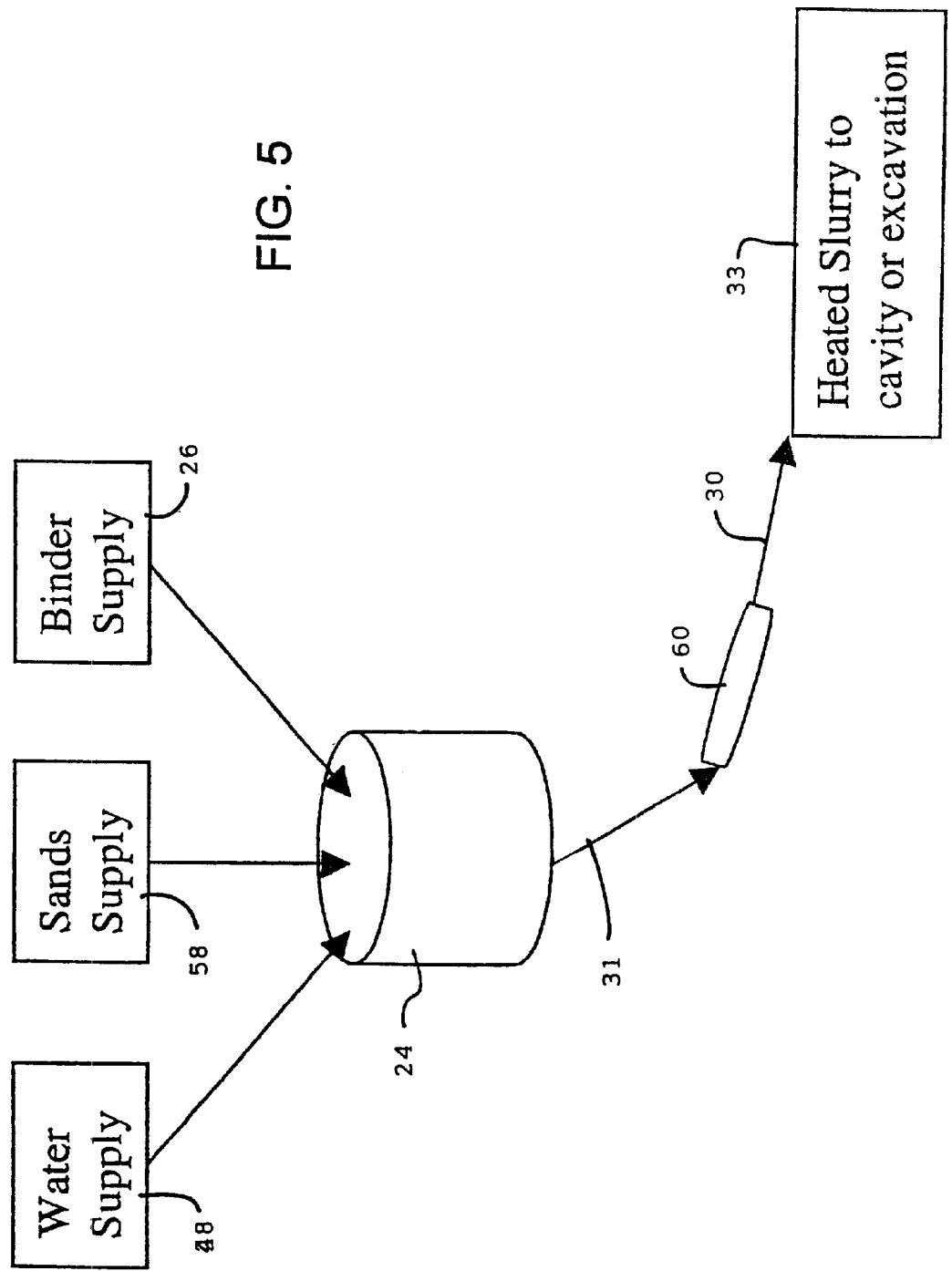

HEAT ADDED TO UNDERGROUND CEMENTED FILL TO OBTAIN BOTH EARLY AND LONG TERM STRENGTH INCREASES

TECHNICAL FIELD

The instant invention relates to treatment techniques for fill for mines in general and, more particularly, to a new and useful method and apparatus for increasing at least one of early strength and/or the long term strength of an underground cemented fill by adding heat to the fill.

BACKGROUND OF ART

It is recognized throughout the mining industry that mining with backfill is necessary to increase recovery and provide a safe working environment for personnel and equipment. Improving the quality of the fill greatly affects the economics of mining, hopefully by reducing the dilution and improving the overall recovery while keeping the cost and environmental concerns in balance. Fill is expensive to place and the mining industry has struggled to maximize the fill quality while balancing this against the cost. Environmental considerations are an important part of the decision process when choosing a fill process. Early strength to improve cycle time has always been an important issue. Early strength achieved in an economical manner is a target for all in the mining industry.

As is well known, when mining with backfill, the primary method of choice for filling, worldwide, is either hydraulic fill or paste fill. There are some serious disadvantages with both the hydraulic fill and the paste fill processes now used. One of the serious disadvantages is that the backfill body has low early strength as well as lower long-term strength, when the backfill is placed under normal low temperature conditions. In particular the low early strength of the hydraulic backfill method results in many mining problems such as increasing the mining cycle time thus decreased mining efficiency, increasing barricade failure risk, producing poor backfill quality causing increased dilution and reducing recovery.

Normally when using hydraulic fill at low temperatures there is essentially no strength within the backfill body for three days, and sometimes even for up to seven days. This means that the mining process is significantly affected, reducing the mining efficiency and productivity.

Mine filling, as presently practiced around the world, creates a serious problem. Both early and long-term backfill body strength must be achieved with a minimum amount of binder (cost) addition and with a minimum amount of water to achieve easy, risk free, fill transport. In order to increase the backfill body strength, the ratio of water to cement has to be low on the one hand, but on other hand, to increase flow-ability of the backfill slurry, much more water has to be used. The typical water to cement ratio is between 0.3 and 0.6, for Portland cement, in order to achieve proper hydration. This is a relatively small proportion of water needed for proper hydration of the binder. In order to meet the requirements for trouble free slurry transportation, the pulp density of the slurry has to be less than 65–70%. This low density facilitates the transport of the hydraulic fill to the mine stope through a pipeline distribution system. The excess amount of water in the backfill slurry has to be drained from the stope. Coarse sands, such as the coarse fraction from mine tailings is normally used in order to facilitate this stope de-watering. In addition to this problem, the cement backfill body takes 7–28 days to reach the required strength. As a result, a long waiting period is necessary in order to safely fill and then continue mining the ore beside the backfilled body. The cycle of drilling, blasting, ore transportation and backfilling is extended.

There are other problems facing existing and traditional Portland cement and slag cement backfill methods:

(a) The excess pour water carries a substantial amount of cement away during the stope de-watering process. This not only causes environmental problems, but also reduces the strength of the backfill body.

(b) The void between the backfill body and the roof or back of the stope cannot be fully filled due to slurry volume loss during de-watering. Multiple backfilling procedures are often required to fill this space.

(c) In order to create high permeability in the backfill body, only the coarse fractions of the tailings can be used. Tailing utilization efficiency is therefore low, at less than 60%. Therefore the large quantity of unused fine tailings has to be disposed of on surface, and the fines can cause additional environmental problems.

(d) The production of ground sands or the purchase of alluvial sands to make mine fill is costly, but may be necessary if the quantity, quality or cost of the tailings available from the mill is inadequate to provide for the mine fill requirements (e) Due to the long fill set up period (7 to 28 days) before the next mining operation, the cycle time for a stope is increased and the mining efficiency is greatly reduced.

In order to solve these technical problems, some mines have tried paste backfill. The binding material used is still Portland cement or slag cement, such as Inco™ 90/10 slag cement, but the pulp density of the slurry is increased to more than 80%. Less water improves the water cement ratio and as a result, the strength of the backfill body is improved over normal hydraulic fill. Also, pastefill has very little excess free water so drainage and the associated binder loss from the stope is not a problem.

Due to the critical flow characteristics of the paste, however, transportation problems can and do occur. Where sufficient vertical height is available, gravity flow can be used for paste distribution. Otherwise pumps are required to overcome the increased head that is created in paste-fill distribution systems. Special mixing equipment such as a double axis mixer is required for mixing paste.

The main problems associated with paste fill are:

(a) A pressure filter is required for making paste. This has a high capital and running cost and the processes to produce and store the product are complex.

(b) Pipeline blockage risk is high due to too the higher pulp density, where marginal changes in the fines quantity or quality or changes to the water content can dramatically affect flow characteristics.

(c) Curing times for pastefill, though better than for hydraulic fill, are still quite long, since the same binder is still used.

(d) Operating costs are high due to the complexity of producing and transporting paste. cement costs for paste are similar to costs when pouring hydraulic fill.

(e) It is difficult to top up a stope, because of the poor flow characteristics of the paste relative to hydraulic fill flow characteristics.

U.S. Pat. No. 5,141,365 discloses that a void in a mine is backfilled by a backfill slurry comprising water, an inert filler, e.g. Portland mine tailings, and a binder, e.g. cement, lime or slag. A gelling agent, e.g. sodium silicate, is added just before placement.

U. S. Pat. No. 4,101,333 discloses a method of backfilling in underground mine using de-watered mill tailings slurry. Portland cement is mixed with backfill aggregate to make the backfill slurry. Both of the patents use Portland cement as binding material, and have the common disadvantages discussed above.

U.S. Pat. No. 5,340,235 discloses a method for hydraulically backfilling empty salt cavities that have been mined. At least one pozzolanically active waste material is combined with an effective amount of an alkaline earth metal hydroxide or alkaline earth metal oxide and saturated brine to form a pozzolanic mixture. The relative proportions are sufficient for reaction under atmosphere conditions in the salt cavity. This then forms a stable, low porosity, load bearing pozzolanic cement.

U.S. Pat. No. 5,106,422 discloses a rapid-setting self-hardening backfill composition and method of installation. The composition comprising a minor amount of class C fly ash as a primary constituent and other filler materials such as class F fly ash as a major ingredient. When combined with water in controlled amounts, they produce a backfilling material which is flow-able and self-leveling for easy installation in utility trenches and similar excavations in street and roadway surfaces to support relatively heavy compressive loads within relatively short periods of time, without settling.

U.S. Pat. No. 3,340,693 discusses adding a reactive substance into a fill mass in a stope or underground cavity after the fill is placed. In particular it discusses adding air into the fill mass after placement to react with fills containing sulphide to help solidify the backfill mass. There is no pre-heating of fill, prior to placement, containing an appropriate cementitious binder to achieve enhanced hardening characteristics.

U.S. Pat. No. 3,478,520 teaches a method for adding expandable plastic materials into underground cavities, then adding heat to the plastic in the stope causing it to expand and fill the cavity. This is not the same as adding heat to backfill containing cementitious material, prior to placement.

U.S. Pat. No. 4,306,814 disclosed an apparatus for making heated concrete; not backfill. It describes how concrete can be heated in a mixing container to reduce set up times once placed in forms.

U.S. Pat. No. 4,877,453 describes a way to make cement, not concrete or cemented fill. A pozzolanic material is combined with calcium and water at very high temperatures to produce superior cement (pozzolan). This then can be used to produce stronger concrete.

U.S. Pat. No. 5,328,508 details a way to make concrete of superior strength by subjecting the mixture to curing under steam, containing minimal liquid water. This describes a method for hydrating Portland cement in a concrete mixture with steam. This has no relationship to making cemented sandfill and adding heat to enhance the fill mass characteristics.

Russian patent SU 1,229,319 deals with leaching an area in a mine where fill has been placed and doing this at elevated temperatures to reduce chemical and oxygen requirements and cost. The premise is that the heat could be derived from the fill mass to save the cost of heating the lechant. This has no relationship to pouring an improved fill by adding heat to the fill.

Other patents disclosing new binder materials for mine backfill are: U.S. Pat. No. 4,992,103 and U.S. Pat. No. 4,798,628.

In order to meet the higher early strength requirements for backfill, many backfilling methods have been developed, such as Garson™ pastefill, which utilizes pastefill with a very high pulp density of 84–86% and which requires no de-watering. The higher cost of the pastefill process and the risk involved with paste transportation limit the wide use of this method.

A no-de-watering hydraulic fill method using high water content binder material has made progress in China. Chinese patent applications 90103141 and 91103829 (equivalent to patents 1,057,825 and 1,067,707 respectively) disclose a process for mine backfill. These processes use so-called "high water content" binder materials to replace Portland cement as the binder to pour a low, 15%–70%, pulp density fill. The "high water content" material binder is made of two parts, termed A and B materials. Both slurry "A" containing the "A" binding material and slurry "B" containing the "B" binding material are delivered to the mine stopes through two separate pipelines. The two slurries are then mixed together at a place close to the backfill stope.

Canadian patent 2,235,526 discloses a high pulp density fast setting and high early strength backfill method and material with fast setting and high early strength properties. The binding material which is mixed with mine tailings, sands, ground sands, industrial solid waste materials, or their mixture and water to make a backfill slurry with 65%–85% pulp density. The backfill slurry is sent to the mine stope through a pipeline either by gravity or by pumping. The backfill slurry in the stope solidifies quickly to form a backfill body having high early strength. The backfill body can reach more than 70% of its final strength in about 12 to 72 hours. The binder for this innovative backfill method is also made of the sulpho-aluminate base materials. The "high water content" materials, however, and the high crystal water content binders are made of sulpho-aluminate base materials, which are not readily available in Canada today. Cost is still relatively high for this product as well.

SUMMARY OF THE INVENTION

The present invention is directed to methods using backfill. More particularly it is directed to a method that increases backfill early and long-term strength by increasing the temperature of the actual backfill materials to a design temperature that is higher than the normal low temperature backfill currently placed.

According to the present invention, the initial and long term strength of hydraulic or paste fill is increased. This is based on the current methods of placing hydraulic or pastefill, at a pulp density of 55%–87% and using different sands and silts, including classified tailings, total tailings, alluvial sands, any kind of silt and any kind of man-made sand. Any kind of binder at binder content ratios of 1.5%–10% by weight can be used. The temperature of the actual backfill materials is increased, including all the sands, silts, binders and water, or their mixture. The additional heat is added at any step or stage of the backfill process, while the process is in operation, to reach a design temperature of the final backfill, mixed slurry or paste, for example, 18–60° C., depending on the actual mix design of the backfill. The devices by which the backfill slurry or paste is heated to reach a required design temperature can be a steam boiler, hot water boiler, furnace or any kind of heating supply system and/or method. The capacity of steam boiler, hot water boiler, furnace or any kind of heating system and/or method chosen will be designed based on the actual initial site temperature of backfill materials and water. The actual pulp density of backfill slurry or paste, the flow rate of backfill slurry or paste and the required temperature of the final mixed backfill slurry or paste also impact the capacity of the heating system installed.

The invention is found to increase backfill early and long-term strength by increasing the temperature of the fill over the normal low temperature hydraulic fill currently poured. This innovation can be applied to current fill systems using classified tailings, total tailings or alluvial sands held in sand silo systems, with a pulp density of 55%–78% or 55%–87%, and with binder content addition rates of 1.5%–10% using any kind of Portland cement or slag cement.

BRIEF DESCRIPTION OF THE DRAWINGS

FIG. 5 is a schematic diagram of a still further system and method of the present invention where the backfill slurry or paste is heated directly.

PREFERRED EMBODIMENT OF THE INVENTION

Figure 1:
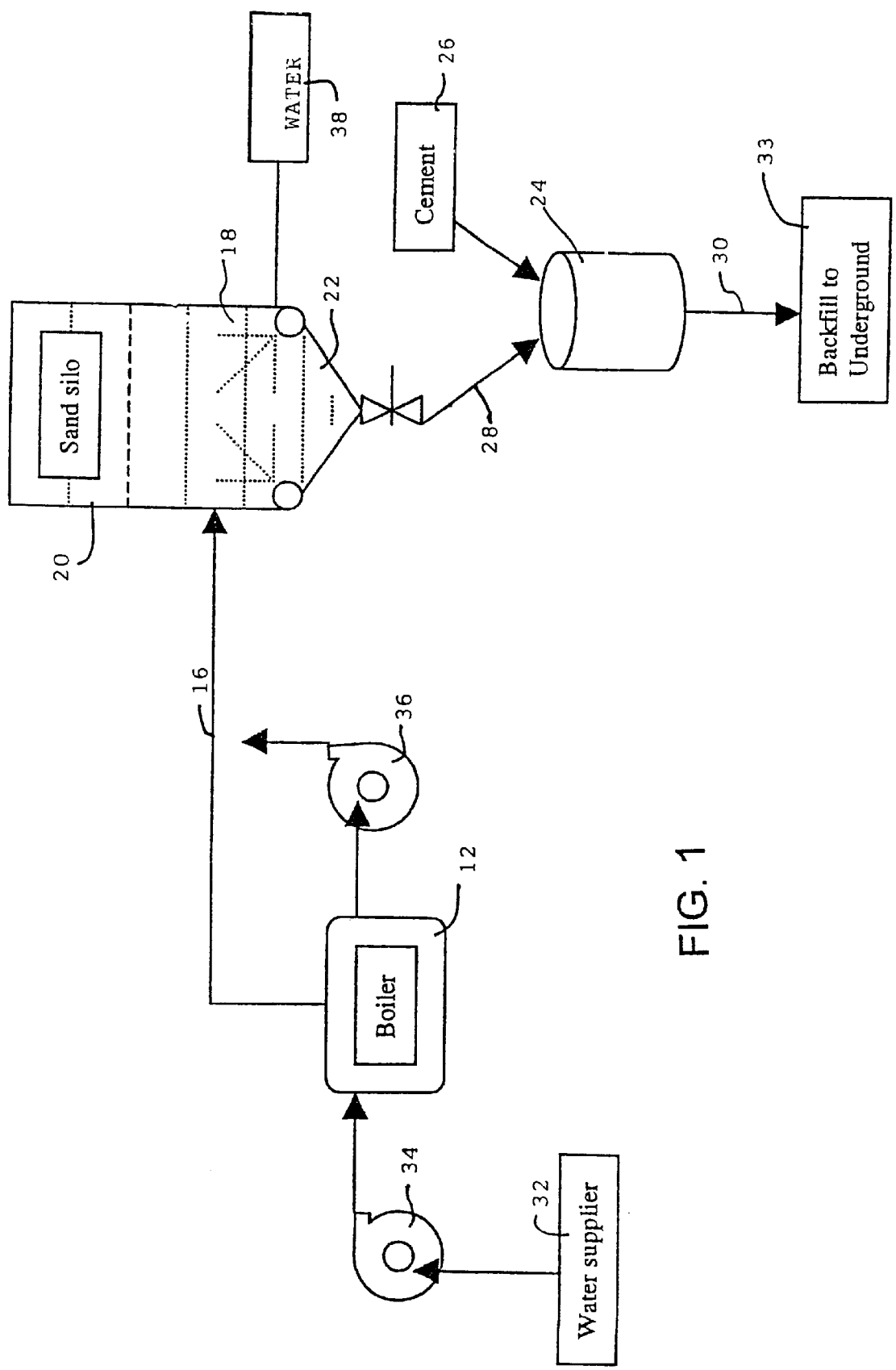
FIG. 1 is a schematic diagram of a system and method of the present invention using a steam boiler.

A heating system, such as steam boiler 12, with sufficient steam generating capacity to make hot steam, is required for the embodiment of FIG. 1. A hot steam output pipeline 16 from the steam supply 12 is directly connected to a nozzle pipeline system 18 of a sand silo 20. This steam is used to heat the sands and water or their mixed slurry to reach a required temperature level, e.g. 18 to 60° C., while the backfill process is in operation. Exhaust pump 36 is at the outlet of boiler 12.

The actual nozzle pipeline system 18 must be installed in the bottom area 22 of the sand silo 20 and is used to inject high pressure water and/or high pressure air to mobilize settled sand in the silo into a slurry with, e.g. 55% to 78% pulp density. This is carried out during the backfilling operation.

If an air/water nozzle system is not installed in the silo, it will be necessary to install one. The higher temperature sand slurry 28 with 55% to 78% pulp density at the bottom area 22 of the silo 20 flows directly to a backfill mixer or mixing tank 24 and is proportionally mixed with a binder fed from a cement silo 26. The binder content is about 1.5%–10% in the final hot backfill slurry at 30 that is supplied to the mine cavity at 33. Water is added if required. Also, a water supply 32 is supplied by a pump 34 to the boiler 12.

The type of the binder from 26 can be any kind of slag cement such as 90/10 slag cement, currently used at Inco, any kind of Portland cement or any other kind of binder. The method of increasing the temperature of the sand slurry in the silo is with hot steam. This is supplied as noted, from steam boiler 12 that produces the required amount of hot steam, under the proper pressure, to the air nozzle pipeline system 18 through the connecting pipeline, during the backfilling process. The hot steam under high pressure from the nozzles is proportionally injected with high-pressure water from a high-pressure water nozzle system 38. This is directed toward the settled sand in the silo which is at a low temperature, e.g. 1 to 17° C., thus increasing the sand slurry temperature, e.g. to 20 to 60° C. Then this higher temperature sand slurry flows directly to mixer 24 and is proportionally mixed with the binder from cement silo 26 to obtain the final higher temperature backfill slurry at, e.g. 18 to 30° C. at 30.

The method increases both the early and long-term backfill strengths over the current hydraulic backfill system capability by increasing the backfill temperature, including sands, water and/or their mixture to reach a required temperature.

Figure 2:
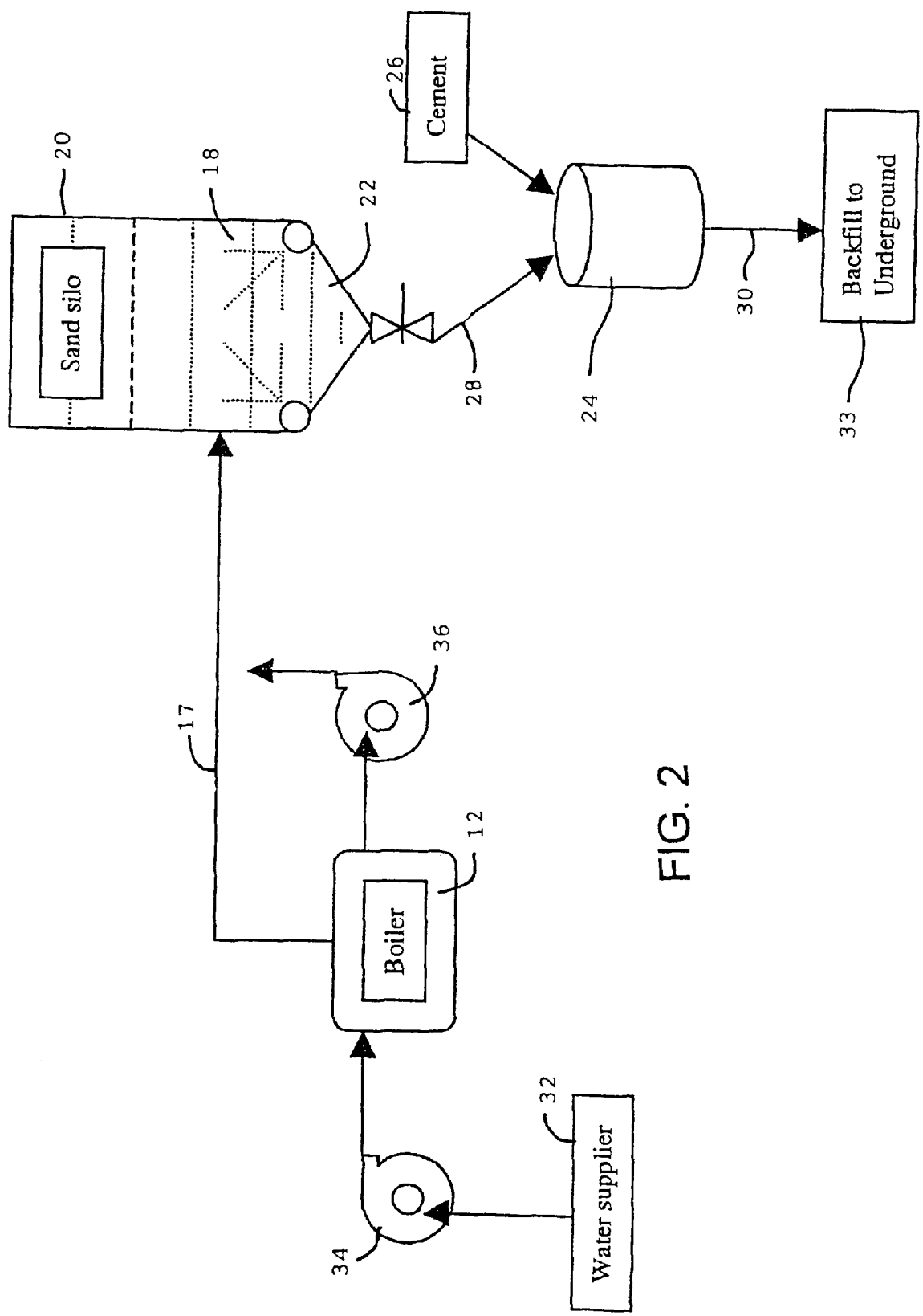
FIG. 2 is a schematic diagram of another system and method of the present invention using a hot water source.

In FIG. 2 (where, as in all the figures, the same reference numerals are used to designate the same or functionally similar parts), hot water supply 17, such as from a hot water boiler 12 with sufficient hot water generating capacity to make hot water under the required pressure, supplies hot water to the silo. Instead of using a cool water supply, the hot water output pipeline 17 of the hot water supply 12 is directly connected to the nozzle pipeline system 18 of the sand silo 20. Injecting this hot water into the sands and water or their mixed slurry raises the temperature of the mixture to 18 to 60° C. when the backfill process is in operation. The actual nozzle pipeline system must be installed in the bottom area 22 of the sand silo 20 and is used to inject high pressure water and/or high pressure air to mobilize settled sand in the said silo into slurry with 55% to 78% pulp density during the backfill operation. The resulting higher temperature sand slurry at 55% to 78% pulp density in the bottom area 22 of the silo flows directly to a backfill mixer 24 and is proportionally mixed with the binder from the cement silo 26. The binder content is about 1.5%–10% of the final backfill mixed slurry. The type of the binder can be any kind of slag cement, such as 90/10 slag cement currently used at Inco, Portland cement or any other kind of binder.

The process for increasing the temperature of the sand slurry in the silo is with hot water from the boiler or furnace 12. This produces the required amount of hot water under the proper pressure and is directly injected through the high-pressure water nozzle pipeline system 18 in the silo, through the connecting pipeline, while the backfill operation is running. The hot water under high pressure is injected through the nozzles into the said settled sand in the silo, which is at a low temperature, e.g. 1 to 17° C. to obtain a higher temperature sand slurry, say 20 to 60° C. Then the higher temperature sand slurry flows directly to a mixer and is proportionally mixed with the binder from cement silo 26 to obtain the final higher temperature backfill slurry at the required temperature, e.g. 18 to 30° C.

Any kind of sand or their mixtures, including alluvial sands, silts, total tailings and classified tailings held in a silo system, in pools, yards, containers or some other storage place can be used with the invention. Pipelines, pumps, conveyors, or any kind of transfer equipment to move the said sands or mixture to a backfill mixing tank where the sands, binder and water are mixed into a backfill slurry or paste are also usable with the present invention.

Figure 3:
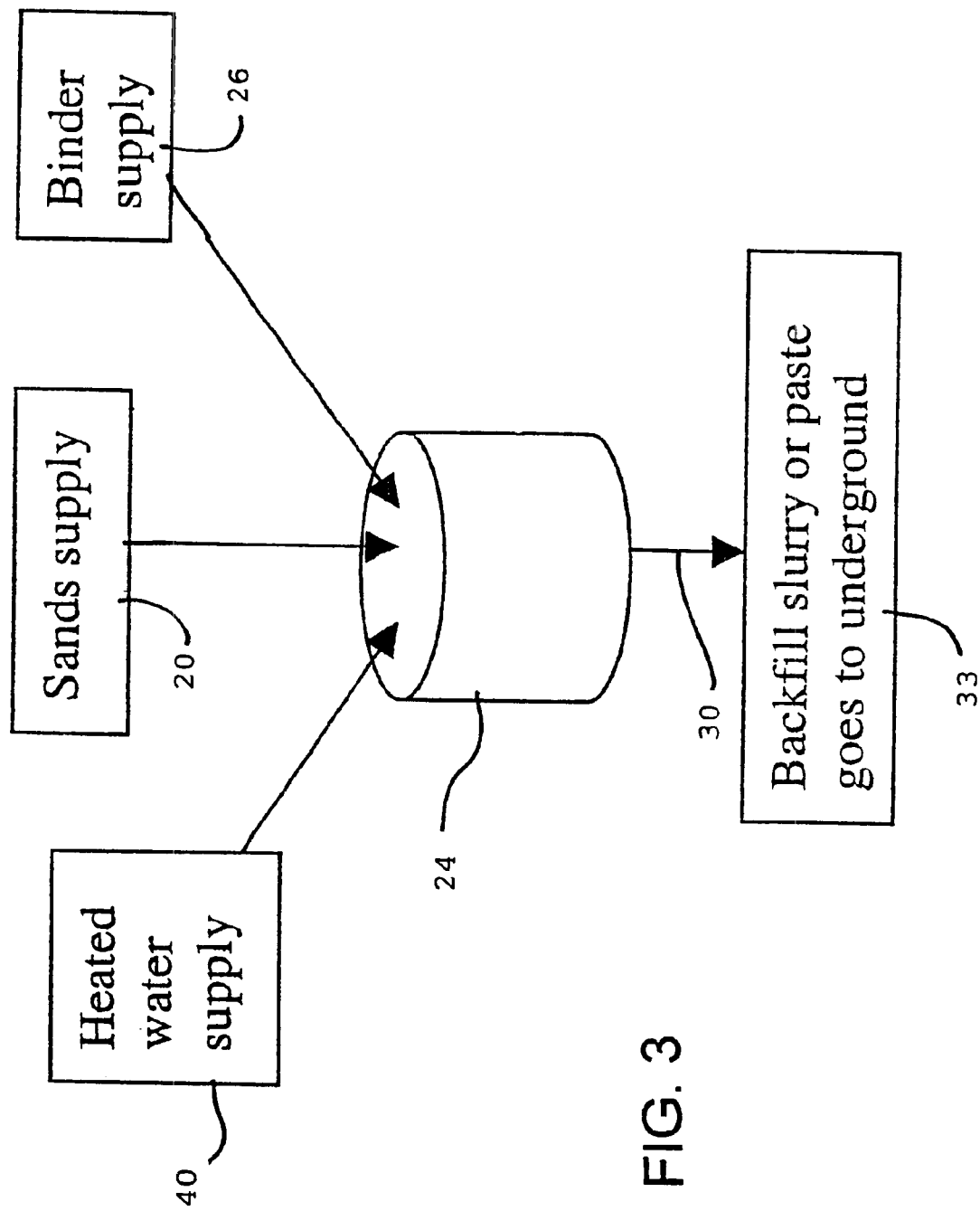
FIG. 3 is a schematic diagram of a further system and method of the present invention where heated water is added directly to a backfill mixture.

Instead of adding normal unheated water, heated water or hot steam which is generated by heating systems such as hot water boilers, furnaces, hot steam boilers or any other warm or hot water supply system 40 can be used to add heat directly into the backfill mixing tank 24 as shown in FIG. 3. There the sands, binder and the hot water or hot steam or their mixture are properly mixed to obtain a heated backfill slurry or paste with a pulp density of 55%–87%, a binder content rate of 1.5%–10%, at the required temperature, about 20 to 30° C.

Figure 4:
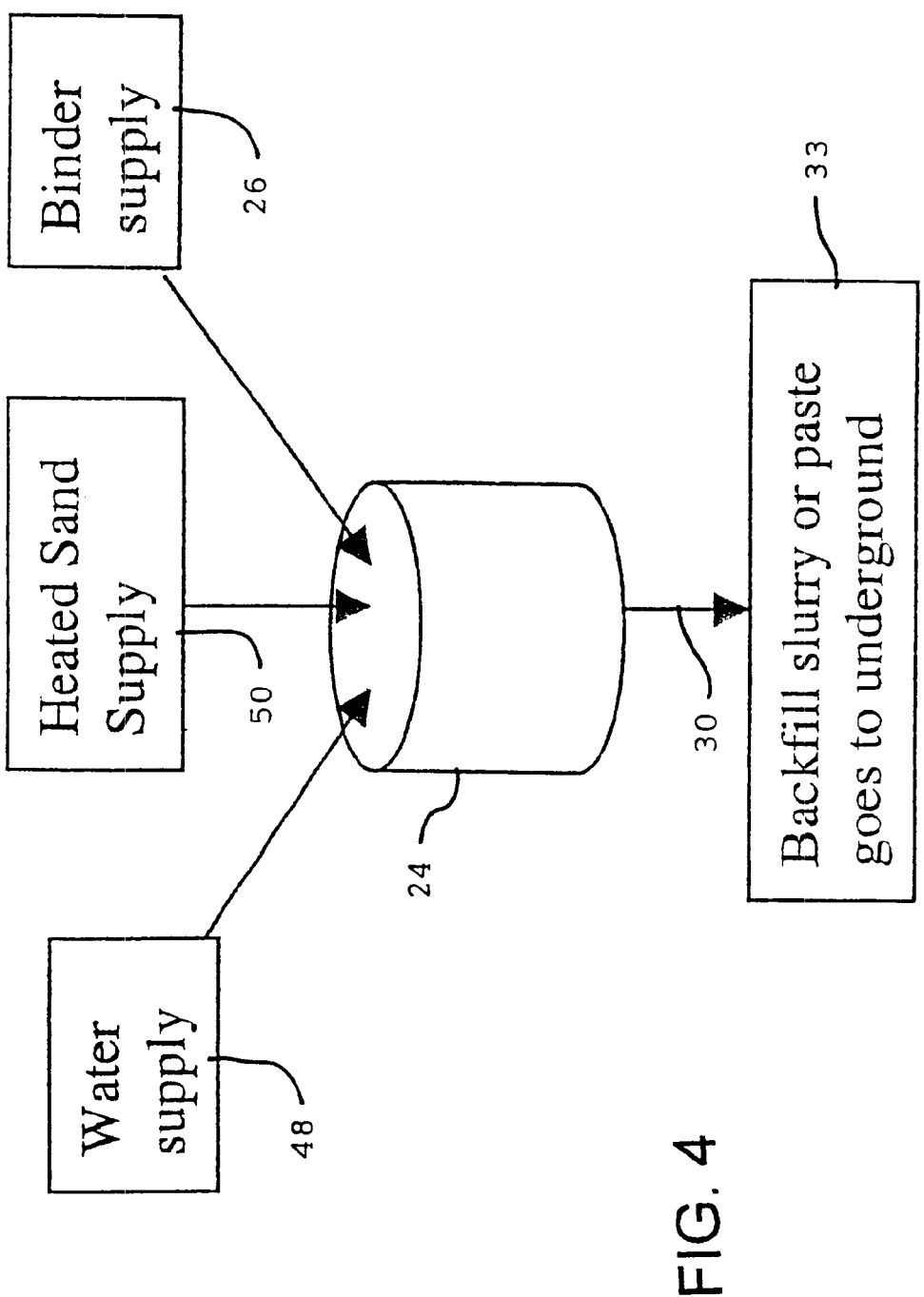
FIG. 4 is a schematic diagram of a system and method of the present invention using heated sand to add heat to the fill.

FIG. 4 illustrates the method for increasing backfill early and long-term strength for paste or slurry fill systems operating at normal low temperature conditions by increasing the temperature. This process could use any kind of sand or their mixtures including total tailings, classified tailings, alluvial sands, silts or silt slurries and any other kind of sands or fines. Any kind of Portland cement, slag cement or other available binder, with a binder content rate 1.5%–10%, could be added to obtain a paste with a pulp density of 73%–87%. In FIG. 4, heated sand supply 50 provides the added heat and unheated heater supply 48 the water.

During the paste filling operation, the backfill materials are heated to make the final paste reach a required temperature, of about 18 to 30° C. The heating procedure can occur at any step or stage in the process. The separate raw materials can be heated before or after being mixed together and/or heat can be added to the paste as it is being transferred to the underground stopes. The heating source can be from a steam boiler, furnace, hot water boiler, oven and/or any other available heat supply.

FIG. 5 illustrates an embodiment of the invention that uses a heater 60, e.g. a microwave heater or oven heater, to heat the slurry from line 31, leaving the mixing tank 24, to produce heated fill on line 30 for the mine cavity 33. Mixer 24 receives un-heated sand from silo 58 and un-heated water from water supply 48, as well as un-heated binder from silo 26.

Table 1 illustrates lab results of strength comparisons between low temperature (11° C.) and higher temperature (25° C.) set time and strength, using Inco Creighton Tailings and 90/10 slag cement as binder. This verifies the usefulness of the present invention.

The embodiments of the invention in which an exclusive property or privilege is claimed are defined as follows:

1. A method for increasing at least one of early and long-term strength of an underground cemented fill comprising:
   mixing a cementitious binder with a sand component and water to form a mine backfill that is a slurry or a paste with a pulp density of about 55% to 87%;
   adding heat to the backfill to raise the temperature of the backfill to about 18 to 60° C. before the backfill is supplied to a mine cavity; and
   supplying the backfill to the mine cavity, the added heat being sufficient to increase at least one of an early strength and a long term strength of an underground cemented fill resulting from the backfill in the mine cavity so that after one day the strength of the backfill ranges from 0.18 to 0.25 mPa.

2. A method according to claim 1, wherein the mixing step uses a binder content of about 1.5 to 10% by weight.

3. A method according to claim 1, wherein the binder is Portland or slag cement.

4. A method according to claim 1, wherein the sand component is at least one of: alluvial sand; man-made sand; silt; classified tailings; and total tailings.

5. A method according to claim 1, including heating the sand component to add heat to the backfill.

6. A method according to claim 5, including supplying the sand component from a sand silo and heating the sand by adding heat to the sand silo.

7. A method according to claim 6, including adding heat to the silo by injecting steam into the silo.

8. A method according to claim 6, including adding heat to the silo by injecting hot water into the silo.

TABLE 1

Strength Comparison between 11 and 25° C. cured samples with varying Silt Content, @ 3% Binder Content and @ 78% Pulp Density

| Pulp Density | Binder Content | Silt Content | Strength Comparison (Mpa) | | | | | | | | References Inco Creighton |
|---|---|---|---|---|---|---|---|---|---|---|---|
| | | | 11° C. - cool | | | | 25° C. - heated | | | | |
| | | | 1 day | 3 days | 7 days | 28 days | 1 day | 3 days | 7 days | 28 days | |
| 78% | 3% | 0% | 0 | 0.3 | 0.43 | 0.75 | 0.18 | 0.5 | 0.57 | 1.38 | Tailings |
| 78% | 3% | 10% | 0 | 0.37 | 0.56 | 1.0 | 0.2 | 0.5 | 0.5 | 1.88 | 90/10 |
| 78% | 3% | 20% | 0 | 0.38 | 0.6 | 1.19 | 0.3 | 0.8 | 2.1 | 2.13 | Slag |
| 78% | 3% | 30% | 0 | 0.43 | 0.68 | 1.38 | 0.25 | 0.68 | 1.9 | 2.4 | Binder |

Table 1, indicates that both the early and long-term strength of the backfill samples cured at the higher temperature, 25° C. are significantly and unexpectedly higher than the results at a lower curing temperature at 11° C.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

9. A method according to claim 1, including heating the water before it is mixed with the binder and the sand component to add heat to the backfill.

10. A method according to claim 1, including adding heat to the backfill by heating the backfill directly after it is mixed and before it is supplied to the mine cavity.

11. A method according to claim 10, including heating the backfill using microwave.

12. A method according to claim 10, including heating the backfill using an oven.

* * * * *